C. R. & C. C. HOLLAND.
HARROW ATTACHMENT FOR PLOWS.
APPLICATION FILED AUG. 17, 1914.
1,129,981.
Patented Mar. 2, 1915.
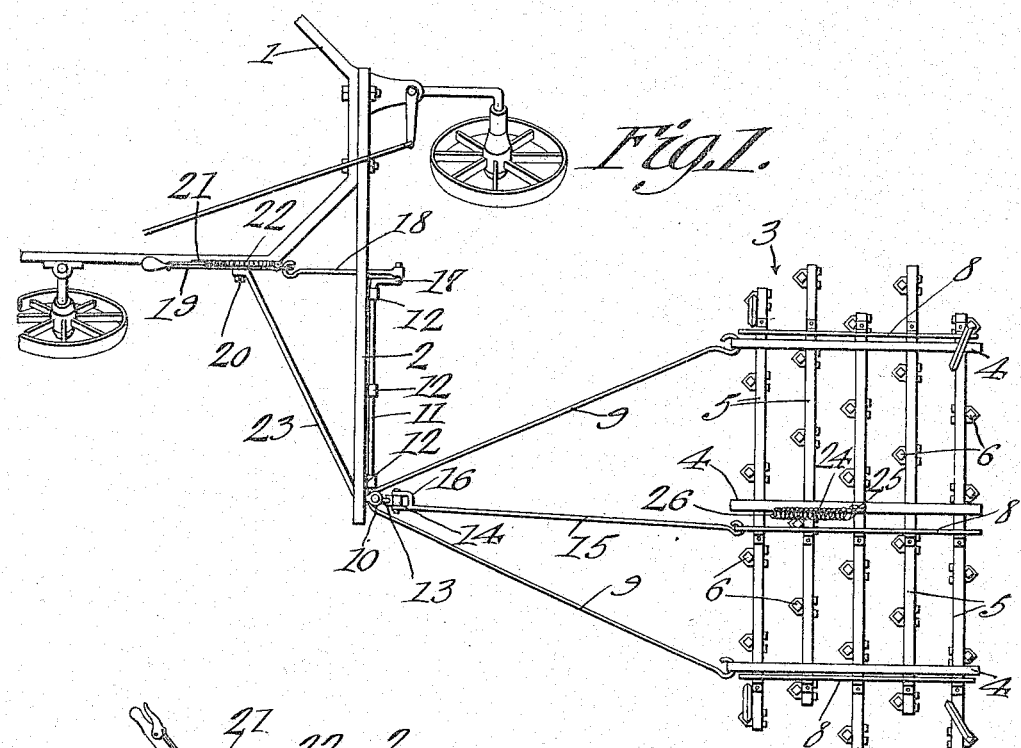
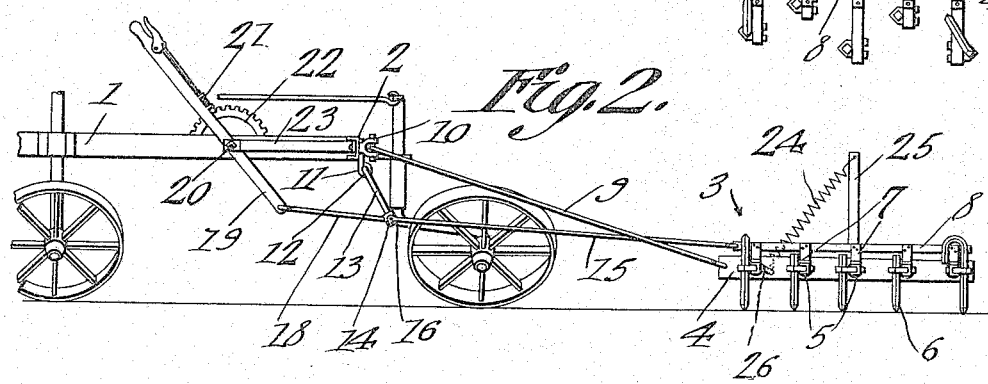
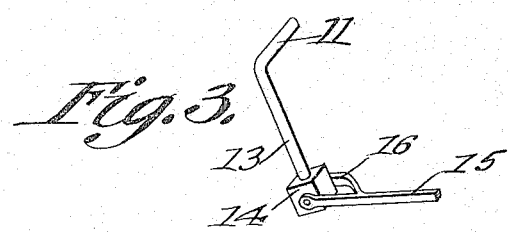

UNITED STATES PATENT OFFICE.

CHARLES R. HOLLAND AND CHRISTOPHER C. HOLLAND, OF TAYLORVILLE, ILLINOIS.

HARROW ATTACHMENT FOR PLOWS.

1,129,981.        Specification of Letters Patent.        Patented Mar. 2, 1915.

Application filed August 17, 1914. Serial No. 857,208.

*To all whom it may concern:*

Be it known that we, CHARLES R. HOLLAND and CHRISTOPHER C. HOLLAND, citizens of the United States, residing at Taylorville, in the county of Christian, State of Illinois, have invented a new and useful Harrow Attachment for Plows, of which the following is a specification.

The present invention appertains to harrows, and aims to provide a novel and improved harrow attachment for wheel mounted or riding plows.

The present invention contemplates the provision of a harrow attachment, whereby a harrow may be connected to a wheel mounted or riding plow frame in a convenient and efficient manner, so that the harrow may trail from the plow frame, a still further object of the invention being to provide a novel operative connection between the harrow and plow frame whereby the harrow teeth may be readily swung to cleaning or clearing position whenever they are clogged with trash or accumulations.

It is also within the scope of the preesnt invention, to provide an appliance of the nature indicated, which will enable the harrow to move freely as it trails in rear of the plow frame, and without impairing the operative connection between the harrow and plow frame for swinging the harrow teeth.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein:—

Figure 1 is a plan view of the attachment as applied to a riding plow, a fragmental portion only of a plow being illustrated. Fig. 2 is a side elevation of the attachment as applied. Fig. 3 is a fragmental detail in perspective illustrating the flexible or universal joint in the actuating mechanism of the harrow for enabling the harrow to move or swing laterally.

In the drawing, the numeral 1 designates the frame of the wheel mounted or riding plow, a fragmental portion only of the plow being illustrated, since it is no part of the present appliance, and may be of any conventional type. In carrying out the present invention, the attachment embodies a laterally projecting arm 2 having one end attached in any suitable manner to the rear end of the plow frame 1, so that the arm 2 projects from one side of the plow. The harrow 3 which may be of any suitable type, is connected to the free or outer end of the arm 2 to trail in rear thereof, the harrow comprising a frame including the bars 4 through which the rock shafts 5 are journaled and to which shafts the depending or downwardly projecting harrow teeth 6 are clamped or secured in any suitable manner. The shafts 5 are caused to swing in unison by means of upstanding arms 7 secured to the rock shafts 5, and connected by the respective links or strips 8. As illustrated, there are three sets of the arms 7 and links 8, although this is not material.

In order to connect the harrow 3 with the free end of the arm 2, a pair of draft rods 9 have their rear ends connected loosely to the forward ends of the side bars 4 of the harrow and the draft rods 9 converge forwardly and are inclined and have their forward ends connected to the free end of the arm 2 by a suitable flexible or universal joint or coupling 10. In this manner, the draft rods 9 may swing vertically and horizontally with respect to the arm 2, while the harrow 3 may swing vertically with respect to the draft rods 9, so that the harrow may ride properly upon the soil. The harrow may also swing laterally due to the fact that the universal joint 10 will enable the draft rods 9 to swing laterally.

As a means for operatively connecting the plow frame 1 and the harrow 3, to enable the plow teeth 6 to be swung into and out of operative position, a rock shaft 11 is journaled through bearings 12 secured to the arm 2, and is provided at its outer end with a downturned arm 13 having a bearing block 14 swiveled upon its lower end. A link or connecting rod 15 is provided with a fork 16 at its forward end trunnioned or pivoted to the sides of the bearing block 14, whereby the link or connecting rod 15 is connected to the arm 13 by a flexible or universal joint. The rear end of the link or connecting rod 15 is pivotally connected to the forward end of the intermediate link 8, so that the oscillation of the shaft 11 will reciprocate the corresponding link 8 for rocking the rocking shafts 5. The link or connecting rod 15 being pivoted to the bearing block 14 and the said bearing block being swiveled to the arm 13 of the shaft 11, will enable the link or connecting rod 15 to swing vertically and horizontally with the draft rods 9 when the harrow 3 moves vertically and laterally.

The inner end of the rock shaft 11 is provided with a downturned arm or crank 17 to which a pitman or link 18 is connected, the said pitman or link 18 being connected in turn to the lower end of the hand lever 19 fulcrumed upon a bolt 20 secured through the corresponding side of the plow frame 1, whereby the hand lever 18 in being oscillated will oscillate the shaft 11. The hand lever 19 is provided with a suitable pawl or dog 21 for engaging a segment or rack 22 secured upon the corresponding side of the plow frame 1, for holding the hand lever at any position to which it is swung.

A brace 23 preferably connects the fulcrum bolt 20 and the free end of the arm 2, to prevent the arm 2 from flexing or bending rearwardly due to the draft created by the drag of the harrow over the soil.

In order to assist in swinging the plow teeth 6 rearwardly to cleaning position, a coiled wire retractile spring 23 connects the upper end of a standard 25 carried by the intermediate bar 4 of the harrow, and an arm 26 projects from the front rock shaft 5 of the harrow, whereby the spring 24 will have a tendency to swing the shafts 5 in such a direction as to move the harrow teeth 6 rearwardly to cleaning position. The effect of the spring 24, however, is ordinarily resisted due to the fact that the link or connecting rod 15 will ordinarily hold the shafts 5 in normal or active position, when the hand lever 19 is swung and set properly.

In practice, the present invention may be readily applied to various wheel mounted or riding plow frames, as will be obvious from the foregoing. Then, as the plow is drawn over the soil, the harrow 3 will trail in rear to pulverize or granulate the superficial portion of the soil. As above pointed out, the harrow is free to move vertically and laterally, due to irregularities in the surface of the soil, and without impairing the operative connection between the harrow and operating lever 19. The operator who is seated upon the plow frame 1 may readily clean the harrow whenever it becomes clogged with trash or accumulations, and to this end it is merely necessary for the operator to swing the hand lever 19 properly to rock the shaft 11 in such a direction as to move the link or connecting rod 15 forwardly. This will cause the shafts 5 to be swung in such a direction as to swing the plow teeth 6 rearwardly, and when the plow teeth ride upon the soil in this position, they will be cleared of any accumulations, as will be evident. As soon as the harrow has been cleaned, the harrow teeth may be returned to normal or active position by swinging the hand lever 19 in the proper direction to pull the link 15 forwardly. As above intimated, when the hand lever 19 is swung to bring the harrow teeth to cleaning position, the spring 24 will assist in moving the harrow teeth rearwardly.

Having thus described the invention, what is claimed as new is:—

1. In a device of the character described, a plow frame, a trailing harrow having swinging teeth, a member attached to the plow frame, draft rods loosely connected to the harrow and having a universal joint with the said member, an oscillatory arm carried by the said member and constituting a portion of an actuating mechanism, a link operatively connected to the harrow to swing the teeth thereof, and a universal joint connecting the said link and arm.

2. In a device of the character described, an arm attachable to a plow frame, a harrow having swingable teeth, draft rods flexibly connecting the harrow and the free end of the said arm, a shaft journaled to the said arm and having arms at its ends, a link connected to one arm of the said shaft and connected operatively to the harrow for swinging the teeth thereof, a hand lever attachable to the plow frame, and a link connecting the hand lever and the other arm of the said shaft.

3. In a device of the character described, a member attachable to a plow frame, a harrow including a frame, rock shafts journaled to the frame and harrow teeth carried by the rock shafts, the said rock shafts having upstanding arms, a link pivotally connecting the said arms, a pair of converging draft rods loosely connected to the harrow frame, a universal joint connecting adjacent ends of the draft rods and first mentioned member, an oscillatory arm carried by the first mentioned member, and constituting a portion of an actuating member, a link connected to aforesaid link, and a universal joint connecting the last mentioned link and the said oscillatory arm.

In testimony that we claim the foregoing as our own, we have hereto affixed our signatures in the presence of two witnesses.

CHARLES R. HOLLAND.
CHRISTOPHER C. HOLLAND.

Witnesses:
ELLIS HOLLAND,
COLUMBUS HOLLAND.